United States Patent [19]
Grenier et al.

[11] Patent Number: 4,921,076
[45] Date of Patent: May 1, 1990

[54] VEHICLE PARK BRAKING SYSTEM

[75] Inventors: Michel Grenier, Dampart; Jean-Etienne de la Gorge, Paris; Daniel Cieplinski, Villemomble; Gérard Leturgie, Auvers S/Oise; Yves Thurin, Suvy en Brie; Laurent Meret, Brunoy; Christian Doireau, Paris, all of France

[73] Assignees: Wabco Westinghouse Equipements Ferroviaires, Sevran; Regie Autonome des Transports Parisiens, Paris, both of France

[21] Appl. No.: 333,885

[22] Filed: Apr. 4, 1989

Related U.S. Application Data

[63] Continuation of Ser. No. 62,645, Jun. 16, 1987, abandoned.

[30] Foreign Application Priority Data

Jun. 23, 1986 [FR] France ................. 86 09018

[51] Int. Cl.⁵ .................. F16D 55/26; F16D 55/08; F16D 69/00
[52] U.S. Cl. .................. 188/12.6; 188/72.8; 188/251 A; 188/353
[58] Field of Search ............. 188/1, 11, 72.6, 72.8, 188/72.7, 353, 73.1, 251 A, 151 A; 92/136; 340/353, 354, 357.3

[56] References Cited

U.S. PATENT DOCUMENTS

| 2,162,770 | 6/1939 | Wilson | 188/73.1 |
|---|---|---|---|
| 2,292,336 | 8/1942 | Farnham | 121/44 |
| 2,914,630 | 11/1959 | Ralston | 188/1.11 X |
| 3,448,579 | 6/1969 | Reznicek | 188/1.11 X |
| 3,860,094 | 1/1975 | Breton | 188/72.2 X |
| 3,899,050 | 8/1975 | Surry et al. | 188/73.1 |
| 3,967,037 | 6/1976 | Marzocchi et al. | 188/215 X |
| 4,022,300 | 5/1977 | Arfandor et al. | |
| 4,159,754 | 7/1979 | Airhert ert al. | 188/72.6 X |
| 4,211,309 | 7/1980 | Ruggiero | 188/83 |
| 4,384,640 | 5/1983 | Trainor et al. | 188/251 A X |
| 4,457,210 | 7/1984 | Pauliukonis | 92/136 X |
| 4,479,397 | 10/1984 | Jelinek et al. | 188/110 X |
| 4,535,874 | 8/1985 | Pollinger et al. | 188/73.1 |
| 4,653,813 | 3/1987 | Burgdorf | 188/1.11 X |

FOREIGN PATENT DOCUMENTS

| 0008452 | 5/1980 | European Pat. Off. | 188/72.8 |
|---|---|---|---|
| 25714 | 3/1981 | European Pat. Off. | |
| 127314 | 12/1984 | European Pat. Off. | |
| 139116 | 5/1985 | European Pat. Off. | |
| 0140241 | 5/1985 | European Pat. Off. | 188/1.1 |
| 1430906 | 5/1964 | Fed. Rep. of Germany | |
| 3319988 | 8/1964 | Fed. Rep. of Germany | |
| 2558581 | 7/1977 | Fed. Rep. of Germany | 188/72.8 |
| 2741103 | 3/1979 | Fed. Rep. of Germany | |
| 1339941 | 9/1963 | France | 188/72.6 |
| 2389043 | 1/1978 | France | |
| 2395584 | 1/1979 | France | |
| 2410173 | 6/1979 | France | |
| 2410175 | 6/1979 | France | |
| 957598 | 5/1964 | United Kingdom | |
| 1103154 | 2/1968 | United Kingdom | 188/73.1 |
| 1179890 | 2/1970 | United Kingdom | 188/72.6 |
| 1201370 | 8/1970 | United Kingdom | |
| 2083146 | 3/1982 | United Kingdom | |
| 2088497 | 6/1982 | United Kingdom | |

Primary Examiner—Robert J. Oberleitner
Attorney, Agent, or Firm—Pollock, Vande Sande & Priddy

[57] ABSTRACT

A braking system having a disk brake that is mechanically connected to at least one wheel of the vehicle and cooperates with a brake caliper that is actuated by a threaded rod screwed through a threaded connection in a control nut rotatively mounted inside the caliper body, the threaded connection being irreversible by axial forces alone. The brake linings are made of an elastomeric material having a high friction coefficient when the disk is not rotating. This system provides a compact parking brake having a high power and a large remote-indication capacity, and is particularly useful in railroad vehicles.

3 Claims, 2 Drawing Sheets

VEHICLE PARK BRAKING SYSTEM

This application is a continuation of application Ser. No. 062,645, filed 6/16/87 now abandoned.

BACKGROUND OF THE INVENTION

Field of the Invention

The present invention concerns a brake system intended for park braking a vehicle and constituted by a brake disk or other annular element forming a friction path, kinematically connected to at least one wheel of the vehicle and surrounded by a brake caliper which is actuated by a screw-nut assembly and which straddles the radial cross-section of the disk and applies to each of its faces a brake lining. The invention also concerns a disk brake caliper for this parking brake system.

The first brakes for wheeled vehicles, especially in the epoch of horse-drawn vehicles, were shoes applied through the intermediary of a braking bar on the treads of the wheels of an of the vehicle axle by means of a crank and screw system transforming by means of a nut the rotation of the screw or of the nut in axial application displacement. The screw which generally had a threaded portion with a square section head, was, however, irreversible by applying on axial force, thereby totally guaranteeing immobilization of the vehicle by maintaining at a halt the braking force applied by the driver via a relatively resilient transmission rigging. The resilient brake application stroke allowed not only modulation of the braking power by a more or less greater rotation of the screw, but furthermore, maintained this brake force at a halt even if slight variations in length of the brake elements occurred, for example following the cooling of the braking paths.

When the pressurized hydraulic brake was applied to more powerful vehicles, such as trains and automotive vehicles, the hydraulic brake which was well adapted for modulating the braking in meeting the needs of the driver, especially pressurized air in trains and heavy road vehicles, has never been able to guarantee the park braking of the vehicle over an extended period of time. The old hand parking brake fitted with a screw has thus remained in use for heavier vehicles such as locomotives and railway cars.

Over the last decades, in order to lighten the work of driving personnel and to remotely-control the park braking function, spring brakes have generally been used and have replaced the hand brakes even in railway applications. These spring brakes appear furthermore to ensure a safety function since they are generally released by pressurized air which is allowed to escape gradually in order to apply the graduated safety brake, the park braking being obtained through a total release of the pressurized air pressure. For railways, graduated service brakes have been produced which are directly controlled by springs with release of the pressurized air pressure in function of the desired braking force for the vehicle and of its load, so as to obtain the desired deceleration, whatever the load of the vehicle, the park or immobilization braking being automatically obtained, moreover in the case of total release or drain of the pressurized air pressure.

These spring brakes have greatly facilitated the driver's work since with their use it has been possible to control the application of the parking remotely through simple action upon a brake lever or an electric switch of the electric parking brake. On the other hand, the problems of accidental application of the parking brake, unknown during the times of the "hand applied" or park braking, have occurred upon sudden rupture of the pressurized hose for release of the spring brake. These accidental applications are generally aggravated by the fact that the driver of a heavy road vehicle then actuates the service brake through reflex, which leads in the case of heavy vehicles to the blocking of the wheels upon which the parking brake applies and to the vehicle leaving the road. For railway vehicles which are provided with a known service brake and parking brake, the train driver is generally not warned or warned too late that one of the parking brakes of his train has been accidentally applied and the train travels with the brake applied on the axle which has undergone an application of the spring brake thereby risking the destruction of the wheels of this axle.

In the case of powerful actuation of the service brake, the addition of the spring parking brake which persists for a long time prior to complete wear of the brake linings and of the service brake at maximal power, can lead to blocking the wheels of this disturbed axle and to the formation of a flattened portion of the wheels.

SUMMARY OF THE INVENTION

The present invention aims at overcoming these drawbacks of spring parking brakes, especially for railroad vehicles intended to be included in a train but also where necessary for heavy road vehicles, allowing the easy remote-control of applying and releasing the parking brake. The parking brake system according to the invention must also guarantee the persistence in time of the application force of the brake linings on the braking paths, while only requiring reduced application power and producing a compact and inexpensive assembly.

The system according to the invention also proposes to give through remote transmission detailed and more reliable data than that obtained up to now on the brake condition (application, release, and wear of the linings) to the driver, including the driver of a relatively long train and even to allow the train to travel safely in the event one of the parking brakes cannot be released, without producing a severe defect in the parking brake system.

With this aim, one of the brake linings immobilized in rotation with respect to the disk and movable in the direction of the disk friction path, is made integral with a threaded rod screwed by an irreversible threading connection, in a control nut rotatively mounted through the intermediary of at least one bearing inside the caliper body and a braking motor is mechanically connected to the control nut for driving it in rotation alternatively in the brake application direction and in the brake release direction. The braking motor is adapted to be set in an inactive position at least after one brake application operation, so that this brake application is maintained through the effect of the irreversible threading connection opposed to the release as long as the braking motor has not been actuated in the release direction or a slack due to wear has not appeared between the brake linings and the brake disk friction paths. The term "irreversible" in this context means that the threaded connection restricts the release by requiring operation of the motor to effect release. The maximal driving torque liable to be supplied by the braking motor to the control nut is distinctly higher in the brake release direction than that liable to be supplied in the brake application direction so as to overcome any possible locking upon release of the parking brake.

According to another embodiment of the brake system according to the invention, at least one of the brake linings is produced in a material which were rapidly in the case of rotation of the brake disk, in order to rapidly suppress the braking torque of a non-released parking brake. At least one of the brake linings can be made of a material such as an elastomer presenting simultaneously: a significative resilience for preserving the application force of the brakes after the setting of the braking motor in an inactive position, a high friction coefficient at least upon halt of the friction path of the disk and a very rapid wear capacity in case of rotation of the brake disk so as to cause the braking torque of the parking brake to rapidly disappear if it cannot be released.

The thickness of the brake linings and the available application stroke are normally sufficient to allow several running operations of the vehicle with an applied parking brake, until the quasi-total disappearance of the braking torque of this brake through wear of these linings, prior to having to change at least one of the brake linings.

According to another embodiment of the brake system intended to immobilize a vehicle, the maximal friction torque that it provides on the brake disk is lower than the driving torque of this disk by adherence on their normal runway of the wheel(s) kinematically connected to the disk, in such a way as to allow the forced running of the vehicle in case releasing the brake is impossible.

According to another embodiment of the brake system according to the invention, the control nut is mechanically connected to manual actuating means adapted to release and/or apply the parking brake through manual rotation of the said nut in case of defect of the braking motor.

According to one particular embodiment of the parking brake system, the control nut is a blind nut the head of which is extended on the side opposite the threaded rod by a tail piece provided at its periphery with gear teeth mating with the teeth of a rack connected by a control rod to an application piston and to a release piston defining pressurized fluid chambers which constitute an application cylinder and a release cylinder adapted to drive the rack axially in the direction producing respectively the application or the release by rotation of the control screw around the threaded rod immobilized in rotation by the brake lining but free in translation. The tail piece of the blind nut rests beyond the gear teeth in a first rotation bearing provided in the body of the caliper, while the portion of the blind nut carrying the internal threaded part screwed on the threaded rod is guided by its periphery in a second rotation bearing having a greater diameter than the first one and provided in the body of the caliper, on the side of the brake lining integral with the threaded rod.

According to a more compact embodiment, the application and release cylinders comprise a single piston movable in a bore and connected to the rack by a support rod crossing in a sealed manner a guiding bore, the applying cylinder being delimited by the face of the single piston fastened to the support rod and the release cylinder being formed by the other face of the single piston, in such a manner as to produce a greater cylinder piston section upon release than upon application.

According to another embodiment of the parking brake system, the rack is integral, on the one hand, with an application piston having a small section and moveable in an application bore where it forms the applying chamber, and on the opposite side, with a release piston having a greater section and movable in a release bore where it forms a brake release chamber. The application and release bores constitute guiding means for the rack combined with a bearing provided between the release piston and the portion of the rack provided with gear teeth mating with the peripheral gear teeth of the control nut. The application and release chambers are adapted to be respectively connected to a pressurized fluid source and to the exhaust in order to produce an application operation of the parking brake and alternatively to the exhaust and to a pressurized fluid source in order to release the parking brake.

According to another embodiment of the invention, allowing the remote transmission of data as to the condition of the parking brake, the back of the rack opposed to the gear teeth of this rack carries at least one axial cam outline cooperating with at least one electrical switch push rod allowing the remote transmission of indications on the stroke of the rack corresponding especially to the release of the brake, to the application of the brake and to the exaggerated wear of the brake linings.

According to one particularly compact embodiment of the parking brake, the body of the caliper comprises a pressurized fluid inlet, such as pressurized air, connected to an application electrovalve and to a release electrovalve that are secured to the body of the caliper and connected to pressure chambers delimited respectively by the application piston and the release piston.

The disk brake caliper intended for the parking brake system presents the features mentioned hereinabove.

BRIEF DESCRIPTION OF THE DRAWINGS

Other aims, features and advantages of the invention will appear evident from the description of an embodiment of the invention, given by way of non-limitative example, and with reference to the appended drawing in which.

DETAILED DESCRIPTION OF A PREFERRED EMBODIMENT

Figure 1:
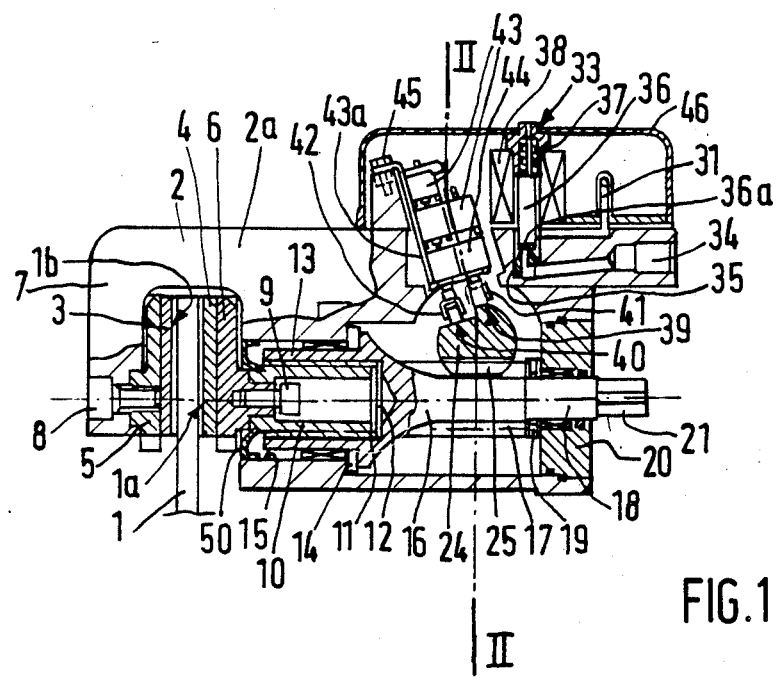
FIG. 1 illustrates a preferred embodiment of the parking brake system according to the invention, viewed in cross-section along a plane passing radially through the non represented center of the braking disk and through the axis of the brake control screw.

The parking brake system shown on the figures comprises the essential elements of a disk brake, namely a brake disk 1 having a small thickness and a brake caliper 2 that straddles the transversal section of the disk 1 to apply on the lateral friction paths 1a and 1b provided on each face of the disk, brake linings 3 and 4 carried by respective metallic brackets 5 and 6. The brake linings are in the present example constituted by an elastomeric material which presents two features that are unusual for a brake lining; a relatively great compressibility in the free condition (not enclosed in a recess, in which case the behavior under compression will be rather that of a hydrostatic liquid) and a very high friction coefficient, at least upon starting, i.e. in the event in functions as a parking brake. Another property of the elastomer friction linings, which is very worthwhile in the application according to the invention, namely their very rapid wear in the case of rotation of the disk, will be specified hereinafter.

The bracket 5 of the fixed brake lining 3 is rigidly connected to one of the legs 7 of the caliper 2 by means of a screw 8 while the bracket 6 of the other lining 4 is made integral, by means of an internal screw 9, of a hollow screw 10 having an external thread screwed in an internal thread 11 provided in the bore 12 of a control nut 13 of the brake. The nut 13 presents a cylinderical external portion which rests on a guiding and abutting bearing 14 (for example, a needle bearing) in a bore 15 of the lateral body 2a of the caliper 2. On the side opposite the hollow screw 10, the nut 13 is extended by a tail piece 16 provided on its periphery with gear teeth 17 and by a bearing portion 18 resting through the intermediary of another abutment and guiding bearing 19 (needle bearing) on a sealing plate 20 fixed in the caliper body 2a. The bearing portion 18 is extended outside the caliper body 2a by a square head 21 on which can be set a manually actuated crank, not represented.

Figure 2:
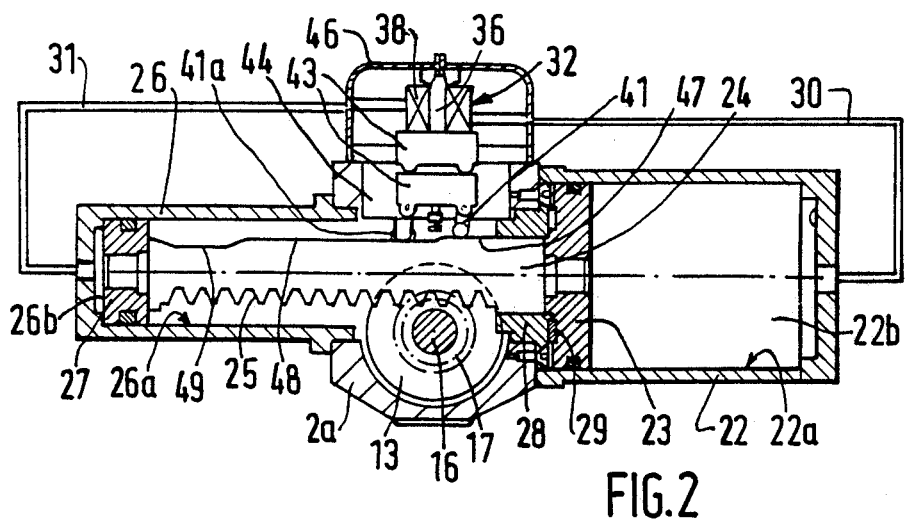
FIG. 2 illustrates the brake system seen in cross-section along the plane II—II of FIG. 1.

With reference to FIG. 2, it can be seen that the caliper body 2a is equipped on either side and transversely to the axis of the control nut 13 with two air cylinders 22, 26 carried over on the inlet bores of the body 2a. The cylinder 22 located to the right of the figure is normally used for releasing the brakes and presents an annular internal lining 22a in which sealingly slides, by means of a seal ring, a pneumatic piston 23 connected rigidly (for example by a thread) to a rack rod 24 which carries on its lower face gear teeth 25 mating with the gear teeth 17 of the tail piece 16. The cylinder 26 disposed to the left of FIG. 2 and having a smaller diameter than the right cylinder 22 presents an internal bore 26a in which sealingly slides, by means of a seal ring, a piston 27 normally used for applying the brake and rigidly connected, like the large piston 23, to the rack rod 24 which is guided to the right of the tail piece 16 by a bearing 28. It will be noted that the release piston 23 that normally arrives in abutment at the end of the stroke towards the left of the figure, comprises an annular abutment 29 which rests on the frontal face of the bearing 28 thus dampening the end of the release stroke of the piston 23. As appears from FIG. 2, the pistons 23 and 27 constitute guiding means of the rack rod 24 combined with the gear teeth 17 of the tail piece 16, the bearing 28 ensuring a complementary axial guiding on the side of the larger piston subjected to the greatest pressure stresses.

Figure 3:
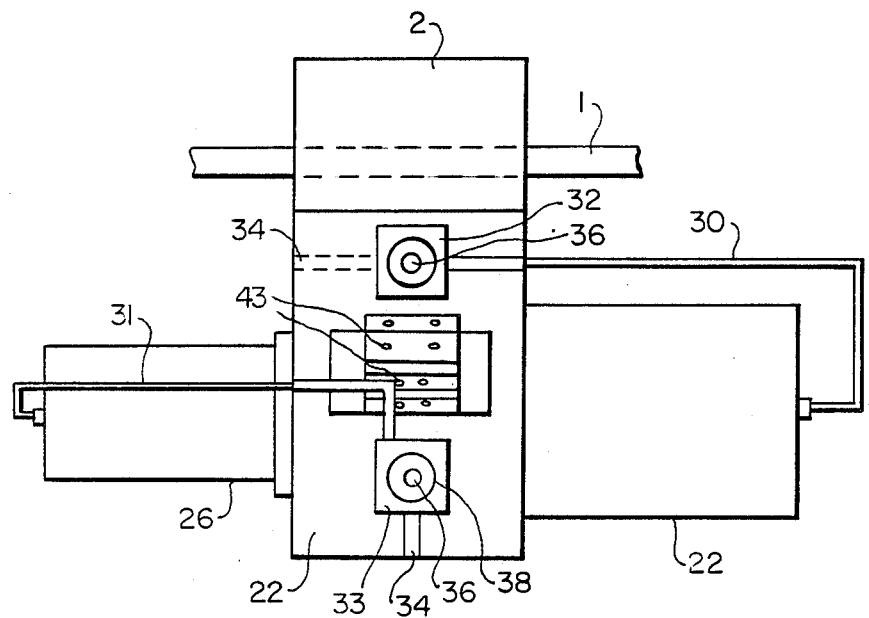
FIG. 3 is a top view of the parking brake system with the protective cover of the electrovalves removed.

The pneumatic chambers 22b and 26b of the cylinders 22 and 26, delimited respectively by the applying and release pistons 23 and 27, are connected by respective pipes 30 and 31 to supply and drain electrovalves 32 and 33. FIG. 1 shows schematically in cross-section the electovalve 33 of the pipe 31 which is connected by a supply connection 34 to a pressurized air source and which presents a flap valve seat 35 and a magnetic core 36 carrying a sealing flap 36a of the seat 35. The core 36 returned towards sealed position by a spring 37 can be attracted by a remotely controlled electric winding 38 which thus causes the flap 36a to unseat from the seat 35 in order to supply the pipe 31 with pressurized air from the connection 34, while the pipe 30 is connected to the exhaust through electrovalve 32 that is shown from above in FIG. 3 and is similar to electrovalve 33.

According to one important aspect of the parking brake system, permitting the remote transmission of the brake functioning data, the back of the rack rod 24, of the side opposite the rack gear teeth 25, carries two parallel cam outlines 39 and 40 (FIG. 1) that cooperate with the push rods 41 and 42 of electric switches 43 mounted in an opening 44 of the caliper body 2a above the rack rod 24. The switches 43 are secured to a support plate 43a hooked onto the edge of the opening 44 by screws 45. The switches 43 and the electrovalves are covered after being set in place by a sealed protective cover 46.

FIG. 2 indicates schematically the cam outline 39 which presents a raised portion 47 cooperating with the push rod 41 to turn this push rod in closed position of a switch 43 indicating the complete release. The push rod 41a of one of the switches 43 is in contact with the long rectilinear cam outline 48 which is ended adjacent to the application piston 27 by a stepped part 49 in the direction of the axis of the rack rod 24.

The functioning of the parking brake system will now be described in detail. When the vehicle is free to run, the pneumatic chamber 22b is supplied with pressurized air through electrovalve 32 and the release piston 23 is returned towards the left of FIG. 2 in the position represented on this figure. The raised position 47 returns the push rod 41 of one of the switches 43 in closed position and remotely energizes on the parking brake light of the train equipped with the parking brake according to the invention, the indication "parking brake released". The brake lining 4 is returned by its bracket 6 at a distance from the friction path of the disk 1 and the parking brake is released. It will be noted that the thread of the hollow screw 10 as well as the control nut 13 and its bearing 14 are separated by an elastomeric sealing sheath 50 from the region of the brake linings 3, 4 and from the brake disk 1 which could project particles blocking the threads.

When the train driver wishes to actuate the parking brake, he electrically and remotely controls the energization of the electrovalves 33 of the various parking brakes and the de-energization of the electrovalves 32, which thereby connects to exhaust the chambers 22b, supplies pressurized air to the chambers 26b and turns the rack rod 24 towards the right of the FIG. 2, by causing the tail piece 16 of the control nut 13 and also this nut 13 to turn through irreversible screwing, the hollow screw 10 towards the left of FIG. 1 to apply the lining 4 on the path 1a of the disk 1 and through reaction of the caliper 2, the brake lining 3 on the path 1b of the disk 1. The movement of the rack rod 24 towards the right of the FIG. 2 stops when, in function of the wear of the brake linings 3 and 4, the reaction of these linings is such that it stops the progression of the hollow screw 10 towards the left of FIG. 1 by blocking the rotation of the control nut 13. In order to facilitate the rotation of the nut 13 on the screw 10, a lubricant such as grease is interposed between the mating threads of the screw 10 and of the nut 13. The push rod 41 rests on the cam outline 48 at the back of the rack rod 24 and the corresponding switch 43 displays on the panel of the parking brake in the driver's cabin the indication "parking brake applied".

The disk 1 is preferably disposed on a portion of the transmission turning at high speed, for example on the outlet shaft of the traction motor and a limited braking torque applied on the disk 1 is sufficient to immobilize the vehicle. Furthermore, as indicated hereinabove, the brake linings 3 and 4 made of an elastomer are elastically pressed thus guaranteeing the persistence of the brake application force and present a very high friction coefficient upon starting of the disk which corresponds to a sort of sticking. The driver who abandons the vehicle or the railway cars with the parking brake applied, can thus suppress the pressurized air pressure. The parking brake is maintained due to the fact that the threaded part of screw 10 is irreversible and with the help of the elastic stroke taken up during the elastic compression of the brake linings 3 and 4.

Upon release of the parking brake, after prolonged parking of the vehicle, a wedging can occur relating to the mating of threaded portions of the hollow screw 10 and the nut 13 and a sticking of the linings 3 and 4 on the friction paths of the disk 1. The large section of the release piston 23 allows the possible wedging of the threaded parts and of the brake linings 3 and 4 to be overcome at the moment of repressurizing the chamber 22b.

If for any reason (wedging, lack of pressurized air upon release, shutting down of the electric control circuit, etc.) the parking brake cannot be completely or partially released, which appears to the driver due to the fact that the push rod 41 is not pushed by the raised portion 47, the driver can allow the vehicle to move with its parking brake applied, by using the power of the driving motor and the adherence of the wheel(s) kinematically connected to the brake disk 1. Indeed, the maximal friction torque of the brake linings 3 and 4 is lower than the traction or normal adherence torque. From the beginning of rotation of the disk 1, the linings 3 and 4 made of an elastomeric material begin to melt and the pressure of the linings 3 and 4 on the braking paths 1a and 1b is released through melting and abrasion of a layer of material at the surface of these linings, since the brake-applying rotation of the control nut 13 is then not continued. The parking brake is thus rapidly released without using the whole of the thickness of the linings 3 and 4 and without risk of blocking the wheels following the accidental addition, during a subsequent braking, of the parking and of the service brake close to their maximal power.

After such a forced starting, the parking brake can again be applied by supplying the chamber 26b with pressurized air. In normal service, the brake linings 3 and 4 that are applied only when the disk 1 no longer turns do not wear. A further release impossibility however provokes rapid wear of the linings and this abnormal wear is displayed on the display panel of the parking brake due to the fact that the push rod 41a is then positioned opposite the stepped port 49. To continue the parking braking risks contacting the brackets 5 and 6 directly with the braking paths 1a and 1b of the disk 1 and scoring this path. In emergency repair, it is thus possible to isolate or render inactive the control electrovalves 32 and 33 and, where necessary, to turn the nut 13 manually for brake application or release by turning a corresponding crank on the actuating square head 21 which protrudes outside the caliper body 2a.

The parking brake system that is described hereinabove in application to the parking brake of a railroad vehicle or, especially an urban or rapid transit railway, allows the remote control and remote monitoring of the parking brake by using compact or built-in brake calipers containing all the equipment necessary for the parking brake and can also be applied to heavy road vehicles.

In the present description an actuating motor for a parking brake system according to the invention has been described in which pressurized air cylinders remotely controlled by electrovalves are used to actuate the nut 13 upon application and release and which corresponds to an advantageous application for railroad vehicles or others equipped with a pressurized air source. The pressurized air can be replaced by another pressurized fluid and, for other applications, it is possible to use an applying and/or release rotating motor, especially an electric motor associated with a speed reducer having a high torque amplification and of which the outlet shaft is directly connected to the tail piece 16 especially by the square section head 21. The electric motor, for example, a direct current motor, can also remote controlled in both rotation directions in order to ensure the application and release and it is possible to maintain an emergency hand-operated shaft such as square head 21, which also allows the withdrawal of the brake linings in order to proceed with their replacement after wear.

It is well understood that the present invention is in no way limited to the embodiments described and represented hereinabove and it is adaptable to numerous variants available to those skilled in the art, without departing from the scope and spirit of the invention.

We claim:

1. A park braking system for mechanical connection to at least one wheel of a vehicle for maintaining said vehicle at rest comprising:

a brake disk having two faces, each of said faces having a friction path, said brake disk enclosed by a brake caliper which straddles the radial cross-section of the disk for applying a brake lining on each of its faces, one of said linings being rigidly secured to said caliper while the other of said linings is movable toward and away from the disk friction path by a threaded rod screwed by an irreversible threading connection in a control nut rotatively mounted through the means of at least one bearing inside the body of said caliper and rotatably driven by application under remote control by a driver of a braking motor either in the brake application direction or in the brake release direction, and adapted to be set in an inactive position, whereby application of said brake is maintained through the opposition of the irreversible threading connection to the release as long as the braking motor is not driven in the release direction, wherein said brake linings are made of an elastomeric material for presenting simultaneously a significant resilience to preserve the application force of the brakes after inactivation of the braking force, a high coefficient of friction when said disk is not rotating, and a rapid wear capacity by melting when the brake disk rotates when the parking brake is not released, thereby causing a fading of the braking torque of the not released parking brake, the control nut being a blind nut, the head of which is extended on the side opposite the threaded rod by a tailpiece which is provided at its periphery with gear teeth and rotatively supported beyond said gear teeth, a gear rack having teeth for mating with said tailpiece gear teeth, the back of said rack opposed to the gear teeth thereof having axial cam outlines, and electrical switches for cooperating with said cam outlines for remote transmissions of indications as to the linear position of the rack corresponding to the release of the brake, the application of the brake or the excessive wear of the brake linings, in cooperation with the remote control of the braking motor.

2. A park braking system according to claim 1 wherein a first rotation bearing is provided in the body of the caliper, while the portion of the blind nut carrying the internal threaded part screwed on the threaded rod is guided by its periphery in a second rotation bearing having a larger diameter than said first rotation bearing and provided in the body of the caliper on the side of the brake lining that is movable, and wherein the blind nut has a coupling portion beyond the first rotation bearing for connection to means for applying a rotational force to said blind nut.

3. A park braking system according to claim 1, wherein said rack is rigidly connected with a brake applying piston having a first cross-section and movable in a brake application bore where it forms the brake applying chamber, and on the opposite side, with a brake release piston having a second cross-section, said second cross-section being greater than said first cross-section, said brake release piston being movable in a brake release bore where it forms a brake release chamber, wherein the brake application and brake release bores constitute a guiding means for the rack combined with a rack bearing provided between the brake release piston and the toothed portion of the rack mating with the peripheral gear teeth of the control nut.

* * * * *